Nov. 10, 1959 R. A. SCHUYLER 2,912,178

MAGNETIC SOUND RECORDING MACHINE

Filed May 27, 1958

INVENTOR.
RALPH A. SCHUYLER

BY K. A. Vanchur 2,912,178

MAGNETIC SOUND RECORDING MACHINE

Ralph A. Schuyler, Los Altos, Calif.

Application May 27, 1958, Serial No. 738,073
6 Claims. (Cl. 242—55.12)

The present invention relates to magnetic sound recording machines of the type employing a magnetizable tape or wire as the recording medium. When recording with machines of this type the recording medium is taken from a supply reel, conducted past the recording head and wound upon a take-up reel which may act as the drive wheel of the machine during the recording operation.

When a machine of the type here under consideration is used in practice, whether for the purpose of recording information or for the purpose of reproducing previously recorded information, it may happen that the supply of tape or wire on the supply reel becomes exhausted before the operator is aware of this fact and stops further operation of the machine. This presents the danger that the continued operation of the drive reel may tear the recording medium from the supply reel necessitating time-consuming repairs that shorten the effective length of the tape or wire.

To avoid such failures in the operation of the machine, it has been the practice to interpose a releasable clutch in the power train between the driving reel and the motor which is employed to turn the reels. Thus, whenever the supply of recording medium is exhausted and the connection of said recording medium to the supply reel opposes further rotation of the take-up reel, the clutch will release the drive reel before the tape or wire is ruptured, and hence the motor may continue to operate without breaking the recording medium or tearing it from the supply reel. While such an arrangement will effectively safeguard the tape or wire, it introduces the danger that an operator may continue to dictate into the machine long after the clutch has released the takeup reel and the tape or wire has come to a standstill so that much valuable information may be lost or at least much of the operator's effort and time be wasted.

It is an object of my invention to provide magnetic sound recording machines, of the type referred to, with a warning device that will inform the operator immediately that the supply of recording medium is exhausted.

More particularly it is an object of my invention to provide a sound recording machine, of the type referred to, with a device that will warn an operator that the tape or wire has come to a standstill and can no longer record any information dictated into the machine, even though the source of power for the tape or wire transporting mechanism continues to operate.

Another object of my invention is to provide a sound recording machine with an audible warning device of the type referred to.

An additional object of the invention is to provide a sound recording machine with an audible warning device that is of the simplest construction, yet is effective and dependable in operation and which, if it increases the cost of the machine at all, will do so to a negligible degree only.

Figure 1:
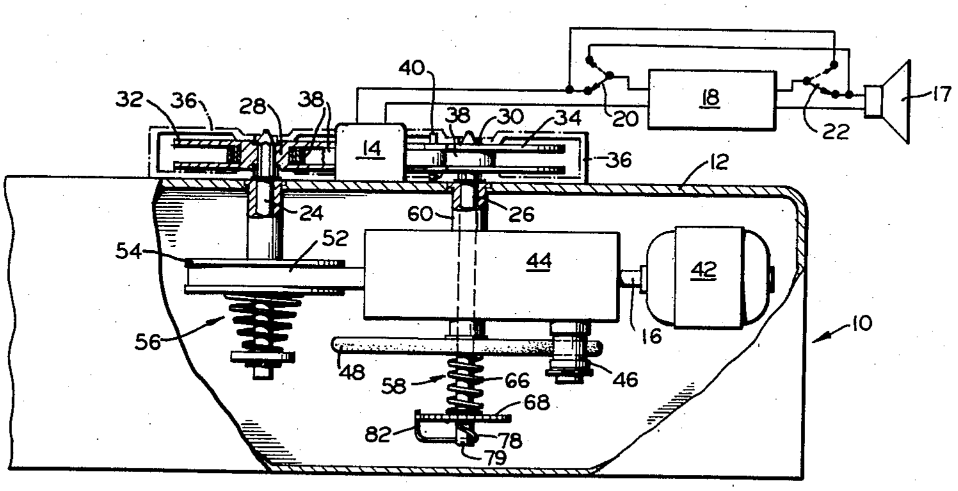

These and other objects of the present invention will be apparent from the following description of the accompanying drawing which illustrates a preferred embodiment thereof and wherein Figure 1 is a fragmentary front elevation of a recording machine embodying my invention partly in section and with a portion of its front wall removed to expose structure behind said wall.

Figures 2, 3:
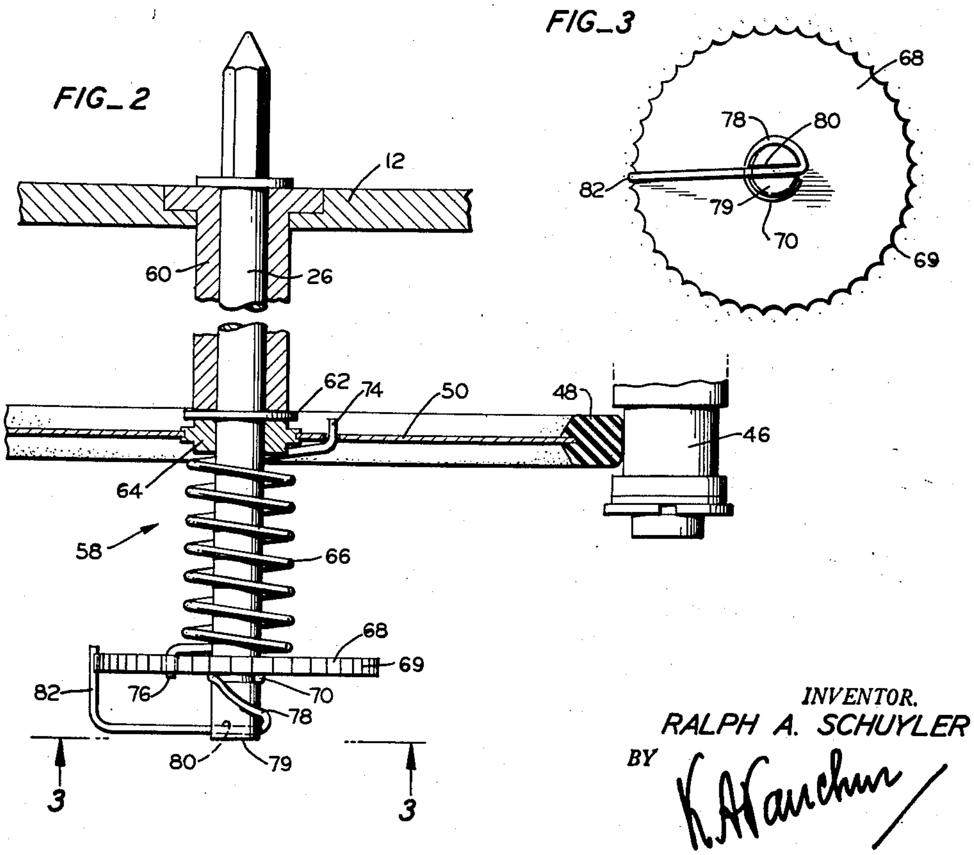

Figure 2 is an enlarged side elevation, partly in section, of the shaft for the supply reel of the machine illustrated in Figure 1, and Figure 3 is an enlarged bottom plan view of the lower end of the supply reel shaft viewed in the direction of the arrows 3—3 in Figure 2.

The recording machine illustrated in the accompanying drawing comprises a casing 10 which may be made of a suitable plastic material and which has a top panel 12 upon which is mounted the recording and playback head 14. Said recording and play-back head is connected to a microphone 17, usually located in the front wall of the casing 10, through an amplifier represented by a block 18, in such a manner that it may be employed for both, recording and play-back, depending upon the position of suitable switches 20 and 22, as diagrammatically indicated in Figure 1. Rotatably mounted within the casing 10 and projecting through and a limited distance above the panel 12 is a pair of vertically disposed shafts 24 and 26. Upon the upper ends of said shafts are engaged the tubular hubs 28 and 30, of two reels 32 and 34, which may be rotatably mounted in corresponding apertures in the top and bottom wall of a recording tape magazine in the form of a flat box 36 of rectangular conformation, as indicated in phantom lines in Figure 1. Anchored with its opposite ends in said reels in the usual manner and wound upon said reels is a magnetizable tape 38. Vertical guide pins 40 held in the top and bottom walls of said magazine guide the connecting run of said tape between the reels 32 and 34 through slots (not shown) in the front wall of the magazine past the recording and playback head 14 in operative relation thereto.

Supported within the casing 10 is an electric motor 42, and an adjustable transmission collectively identified by the block 44 in interposed between the output shaft 16 of the motor 42 and the vertical reel shafts 24 and 26. Said transmission is constructed in such a manner that it may selectively be set to drive the shaft 26 in a clockwise direction, as viewed from the top in Figure 1, at a low speed, while shaft 24 is permitted to idle, or to drive shaft 24 in the opposite direction at a rapid speed while shaft 26 is permitted to idle. The upper ends of both the shafts are of polygonal cross section (Figures 1 and 2) and the interior of the tubular hubs 28 and 30 of both the reels are of corresponding conformation so that the shafts 24 and 26 are in driving engagement with their respective reels 32 and 34, whenever said reels are mounted upon said shafts. Thus, whenever the motor 42 is set into operation, with the recording head 14 adjusted for recording by setting the switches 20 and 22 to the positions shown in full lines in Figure 1, and the transmission 44 is adjusted to turn the shaft 26, said shaft acts as the drive shaft, and the tape is unwound from reel 32, is moved past the recording head 14 at a relatively low speed to have music or information recorded thereon and is then wound up upon the reel 34. On the other hand, when it is desired to return part or all of the tape to the supply reel 32 so that the information or music recorded thereon may be played back or that errors may be corrected, the transmission 44 is set to drive the shaft 24 at a relatively rapid speed while permitting the shaft 26 to idle. As a result the supply reel 32 turns rapidly in a direction opposite to the direction in which it turned during the recording operation, and winds up the tape with the information or music recorded thereon.

In the particular embodiment of the invention illustrated in the accompanying drawing I employ a transmission of the type illustrated and described in my co-pending patent application Serial Number 649,871, filed on April 1, 1957, now Patent No. 2,838,959. This transmission comprises a vertically disposed stubshaft 46, and when the transmission is set to drive the shaft 26 of the tape-up reel, the mechanism of the transmission moves said stub shaft into engagement with a rubber tire 48 that covers the edge of a disk 50 which is mounted upon the shaft 26 of the take-up reel. The transmission comprises also an endless belt 52 that is trained around a pulley 54 which is mounted upon the shaft 24 of the supply reel 32 and which is held in operative engagement with said shaft by a suitable friction clutch arrangement collectively identified by the reference numeral 56. Said belt 52 is normally in slack position which renders it ineffective to transmit rotary power to the pulley 54, but when the transmission is set to drive the supply reel 32, the mechanism of the transmission, while effective to withdraw the stub shaft 46 from contact with the edge of disk 50, operates to tighten the belt 52 so that said belt is effective to transmit rotary power from the transmission 44 to the pulley 54 and turn the shaft 24 of the supply reel in the reverse direction.

To prevent the rotary power applied to the shaft 26 of the take-up reel through transmission 44 from tearing the tape from the supply reel 32, whenever the total supply of tape has been drawn from said reel and has been wound upon the take-up reel, the drive disk 50 is not rigidly secured to the shaft 26, but is coupled to said shaft through a friction clutch arrangement which is collectively identified by the reference numeral 58 in Figure 1 and is illustrated in greater detail in Figure 2. As shown in said Figure 2, the shaft 26 is rotatably held in a bearing 60 that is mounted in the top panel 12 of the machine case. Firmly secured to said shaft 26 below the bearing 60 is a collar 62, and the hub 64 of the disk 50 is held in frictional driving engagement with the bottom surface of said collar 62 by a spring 66 that is coiled around the lower end of shaft 26 and is compressed between the lower face of the disk 50 and a circular retaining plate 68 that is rotatably mounted upon said shaft near the lower end thereof and is held upon said shaft by a wire loop 70 which engages an annular groove 72 provided in the lower end of shaft 26 exteriorly adjacent the circular retaining plate 68. The frictional engagement of the disk hub 64 with the collar 62 causes the shaft 26 to participate in the movement of the rubber tired disk 50 until rotation of the shaft 26 is opposed by a force that exceeds a predetermined level that is established by the strength of the spring 66, whereupon the hub of the disk 50 will slip relative to collar 62 and thus release the shaft 26. This level is so chosen that the shaft will be released before the force exerted upon the tape by the torque of the rubber tired disk 50 is large enough to rupture the tape or tear its end from the hub of the supply reel. Thus, whenever the supply of the tape on the supply reel becomes exhausted as the transmission 44 is set to drive the take-up reel in a forward direction, the described friction clutch arrangement will release the shaft 26 of the take-up reel while the rubber-tired disk 50 continues to rotate. When this occurs there exists the danger that the user of the recording machine may continue to dictate into the microphone oblivious of the fact that the tape has come to a standstill; and in this manner much of the user's time and effort may be lost; in fact if the condition is not discovered in time much valuable information believed to have been recorded may be lost in its entirety.

In accordance with my invention I provide means that produce an audible warning signal whenever the shaft 26 has come to a halt while the driving disk 50 continues to rotate, to indicate to the user that the machine is no longer in a position to make recordings. For this purpose I serrate the edge of the circular retaining plate 68 somewhat in the manner of a gear as indicated at 69 in Figures 2 and 3, and I anchor the ends of the coil spring 66 in the drive disk 50 and the plate 68 as indicated at 74 and 76 respectively, so that the retaining plate will turn in unison with the drive disk whether the reel shaft 26 has come to a standstill or not; and I bend the wire of the loop 70 adjacent the outer face of the retaining plate 68, out of the plane determined by said loop into a helix convolution 78 (Figure 2) that drops to the bottom end of the shaft where it is bent over the end face 79 thereof to engage a diagonal groove or recess 80 formed in said end face (Figures 2 and 3) and projects radially beyond the end face of the shaft to a point vertically below the serrated edge 69 of the circular plate 68. At this point the wire is bent upwardly to form a finger 82 whose point engages the serrated edge of the plate 68. Thus, whenever the supply of tape is exhausted and the shaft 26 comes to a standstill while the drive disk 50 continues to rotate, the connection of the retaining plate 68 with the drive disk 50 as established by the spring 66, forces said plate 68 to participate in the rotary movement of the drive disk, but the spring finger 82 which engages the serrated edge of said plate remains stationary since it is engaged in the diagonal groove 72 in the bottom face of the now stationary shaft 26. The rotation of the circular plate 68 while its serrated edge is engaged by the stationary spring finger 82 produces a clicking or rasping sound that warns the operator immediately that the tape supply of the machine is exhausted and that the machine is no longer in condition to record any information or music delivered into its microphone.

The described warning device is immediately and dependably effective when the supply of tape is exhausted and the machine is unable to record; it adds little or nothing to the cost of the machine, because it is constituted by componets that are normally found in the machine and which are merely somewhat modified to perform in the described manner. Thus, the spring-containing plate 68 is normally present in any machine wherein the drive member of the shaft for the take-up reel is releasably secured to said shaft to protect the tape or wire from rupture, and the serrations in its periphery add only very little to its cost; and the wire which forms the loop 70 and the spring finger 82 of the warning device takes the place of the retaining ring that is normally employed to retain the spring-containing plate, and costs actually less than such a retaining ring.

Hence, the present invention provides a magnetic recording machine that has a warning device which will dependably warn the operator whenever the tape supply is exhausted, at no or only a negligible additional cost.

While I have described my invention with the aid of a particular embodiment thereof, it will be understood that the invention is not limited to the specific constructional details illustrated and described, which may be departed from without departing from the scope and spirit of my invention.

I claim:

1. A magnetic sound recording machine comprising a supply reel, a take-up reel, a magnetizable recording medium wound upon said reels and having its opposite ends anchored in said reels, means including a drive shaft for turning said take-up reel for unwinding the recording medium from said supply reel and winding it upon said take-up reel, and means including said drive shaft for producing an audible warning signal upon exhaustion of the supply of recording medium on said supply reel.

2. A magnetic sound recording machine comprising a supply reel, a take-up reel, a magnetizable recording medium wound upon said reels and having its opposite ends anchored in said reels, means for turning said take-up reel including a drive shaft and a drive element for said shaft secured to said shaft in such a manner as to release said shaft when rotation of said take-up reel is opposed, and means including said shaft and said drive element thereof for producing an audible warning signal upon exhaustion of the supply of recording medium on said supply reel and consequent release of said shaft by said drive element.

3. A magnetic sound recording machine comprising a take-up reel, a supply reel, a magnetizable recording medium wound upon said reels and having its opposite ends anchored in said reels, a sound head located adjacent the connecting run of said recording medium between said reels, means operable to turn said take-up reel to unwind the recording medium from said supply reel, transport it past said sound head and wind it upon said take-up reel including a shaft for said take-up reel, a rotary drive member for said shaft, yieldable means for urging said drive member into driving engagement with said shaft, said yieldable means being adapted to release said shaft when rotation of said shaft is opposed by a predetermined force, and a warning device having cooperating elements supported from said rotary drive element and said shaft effective to produce an audible warning signal whenever said shaft comes to a halt while said rotary drive member continues to rotate.

4. A drive mechanism for the reel of a magnetic sound recording machine employing a magnetizable recording medium, such as a tape or wire, comprising a shaft for the reel, said shaft having an annular shoulder, a rotary drive element mounted loosely upon said shaft adjacent said shoulder, a circular plate having a serrated edge mounted loosely upon said shaft on the side of said rotary drive element remote from said shoulder, means on said shaft blocking movement of said circular plate axially of said shaft in a direction away from said drive element, a spring interposed between said circular plate and said drive element to urge said drive element into frictional driving engagement with the annular shoulder on said shaft, said spring having its opposite ends anchored in said drive element and said circular plate respectively to force said circular plate to participate in the rotary movement of said drive element, and a finger supported from said shaft in engagement with the serrated edge of said circular plate to produce a warning sound whenever said shaft comes to a halt while said rotary drive member continues to rotate.

5. A drive mechanism for the reel of a magnetic sound recording machine employing a recording medium, such as a tape or wire, comprising a shaft for the reel, said shaft having an annular shoulder, a rotary drive element mounted loosely upon said shaft adjacent said shoulder, a circular plate having a serrated edge mounted loosely upon said shaft on the side of said rotary drive element remote from said shoulder, a wire loop on said shaft blocking movement of said circular disk axially on said shaft in a direction away from said drive element, a spring interposed between said circular plate and said drive element to urge said drive element into frictional driving engagement with said annular shoulder on said shaft, said spring having its opposite ends anchored in said drive element and said circular plate respectively to force said circular plate to participate in the rotary movement of said drive element, and a finger supported from said shaft in engagement with the serrated edge of said circular plate to produce a warning sound whenever said shaft comes to a halt while said rotary drive member continues to rotate, said finger being formed by an extension of said wire loop.

6. Arrangement according to claim 5 wherein said wire loop has an extension that drops to the lower end of said shaft, is bent to extend diagonally across said shaft in a groove provided in the lower end face thereof to a point vertically below the edge of said circular plate, and is bent upwardly to have its end in engagement with the serrated edge of said plate.

References Cited in the file of this patent

UNITED STATES PATENTS

| | | |
|---|---|---|
| 2,624,306 | Hatke | Jan. 6, 1953 |
| 2,712,448 | Schroter | July 5, 1955 |
| 2,768,795 | Norton | Oct. 30, 1956 |